United States Patent
Marco

(10) Patent No.: US 6,877,157 B2
(45) Date of Patent: Apr. 5, 2005

(54) MULTI-TASKING SOFTWARE ARCHITECTURE

(75) Inventor: Yves Marco, Orsay (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 801 days.

(21) Appl. No.: 09/749,143

(22) Filed: Dec. 27, 2000

(65) Prior Publication Data

US 2001/0018716 A1 Aug. 30, 2001

(30) Foreign Application Priority Data

Dec. 30, 1999 (EP) ............................................ 99403326

(51) Int. Cl.[7] .................................................. G06F 9/00
(52) U.S. Cl. ........................ 718/102; 718/100; 718/103; 718/107; 719/318
(58) Field of Search ................................ 718/100, 102, 718/103, 107, 101, 104, 105, 106; 719/318, 321; 710/8

(56) References Cited

U.S. PATENT DOCUMENTS

| | | | | |
|---|---|---|---|---|
| 4,395,757 A | * | 7/1983 | Bienvenu et al. ............ | 718/104 |
| 5,313,638 A | * | 5/1994 | Ogle et al. ................... | 710/200 |
| 5,327,558 A | * | 7/1994 | Burke et al. .................... | 710/8 |
| 6,567,840 B1 | * | 5/2003 | Binns et al. ................. | 718/103 |
| 6,631,394 B1 | * | 10/2003 | Ronkka et al. ............. | 718/100 |
| 6,633,942 B1 | * | 10/2003 | Balasubramanian ........ | 710/264 |
| 6,687,257 B1 | * | 2/2004 | Balasubramanian ........ | 370/429 |

FOREIGN PATENT DOCUMENTS

| | | | |
|---|---|---|---|
| EP | 0592117 A2 | 4/1994 | |
| WO | WO9724671 | 12/1996 | ........... G06F/11/30 |

* cited by examiner

Primary Examiner—Majid A. Banankhah

(57) ABSTRACT

The invention relates to a computer program product comprising semaphore means for stalling a first task until one of a predetermined set of events occurs. The computer program product comprises specific message files associated with said first task for receiving data to be processed by the first task. The occurrence of one of said set of predetermined events causes a piece of data to be written in one of the associated messages files. The computer program in accordance with the invention can be implemented by using any operating system having basic synchronization tools. Such synchronization tools include semaphore means for causing a task to be waiting for a unique event such as the release of the semaphore by another task. They also include blocking mechanisms for temporarily blocking "interruptions" coming from interruption handlers during data writing (message reception) in the message files associated with the first task. The invention, in effect, provides an equivalent to the "select mechanism" but uses only very basic synchronization tools so as to be suitable for embedded systems.

20 Claims, 3 Drawing Sheets

MULTI-TASKING SOFTWARE ARCHITECTURE

The invention relates to computer systems and software architecture for computer systems. More particularly, it deals with software architecture comprising semaphore means for stalling a task until one of a predetermined set of events occurs.

European patent application No.592 117 A2 describes an asynchronous inter-process communications arrangement in an operating system for real-time and multiprocessor applications.

It is an object of the invention to provide a computer program product for real time applications, using an inexpensive operating system suitable for use in, for example, embedded systems.

In accordance with the invention, a computer program as defined in the opening paragraph is characterized in that the computer program comprises specific message files associated with said first task for receiving data to be processed by the first task, the occurrence of one of said set of predetermined events causing a piece of data to be written in one of the associated message files. The consequences of the predetermined events may include, for example, writing in one of the specific message files from another task or from an interruption handler. The latter can be triggered by a hardware interruption (IT) which causes the current task to be stopped or "interrupted" by an interruption handler for processing the hardware interruption. The computer program in accordance with the invention can be implemented by using any operating system having basic synchronization tools. Such synchronization tools include semaphore means for causing a task to be waiting for a unique event such as the release of the semaphore by another task. They also include blocking mechanisms for temporarily blocking "interruptions" coming from interruption handlers during data writing (message reception) in the message files associated with the first task. The word "interruption" is put between quotation marks so as to distinguish it from an "interruption" caused by an interruption handler from the hardware interruption which is to be handled by the interruption handler and is the source of the software "interruption". Blocking mechanisms for temporarily blocking "interruptions" from interruption handlers allow prevention on of a memory conflict during storage of the data corresponding to the message to be sent to the first task. Embedded systems are preferably implemented by using simple operating systems (OS). Such OS generally do not comprise sophisticated synchronization tools such as "select" means for causing the execution of a task to be dependent on several events coming from different entities such as tasks and IT handlers. In contrast, complex OS generally comprise a "select" mechanism using file descriptors which allow stalling of a task (that is to say, to send a task to sleep) until a predetermined event occurs. A data writing in one of the files is an example of an event. This implies that the OS comprises file-handling means which are rather complex. Thus, they are not appropriate in embedded systems. The invention, in effect, provides an equivalent to the "select mechanism" but uses only very basic synchronization tools so as to be suitable for embedded systems.

Another advantage of the invention relates to the following aspects. An interrupt handler, which has very poor capabilities compared to a task, can directly write into a message file of the type of, for example, a simple FIFO (first in first out) data structure. Since writing data in such a message file substantially requires pointer manipulations, this can be performed by an interruption handler (as well as by a task). In complex OS using file descriptors, it is not possible for an IT handler to write into a file. In this case, actually, a data writing requires actions which are much more complex than pointer manipulations so that they cannot be performed by an interruption handler. By using a simple data structure, called message file, associated with a task, the invention allows a task to receive messages directly from interruption handlers as well as from other tasks, which is very interesting.

The invention and additional features, which may be optionally used to implement the invention to advantage, are apparent from and will be elucidated with reference to the drawings described hereinafter.

Figure 1:
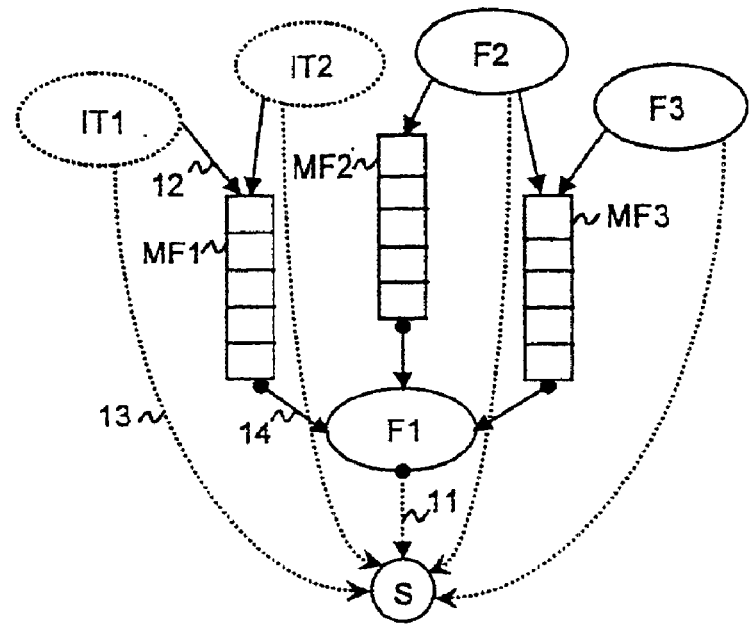
FIG. 1 is a conceptual diagram illustrating the invention.
Figure 2:
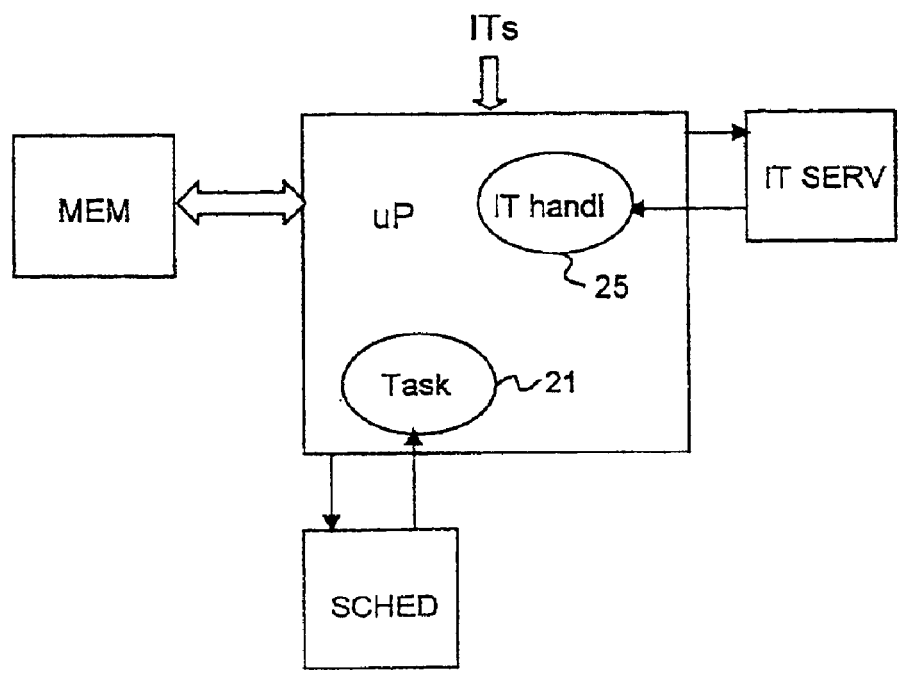
FIG. 2 is a block diagram of a computer system according to the invention.

FIG. 1 illustrates a computer program product according to the invention having a software architecture for synchronizing a first task F1 with respect to a set of predetermined events. The predetermined events may cause the execution of tasks denoted F2 and F3 or of interruption handlers (or IT handlers) denoted IT1 and IT2. The tasks and IT handlers are carried out by a microprocessor as illustrated in FIG. 2. The IT handlers handle hardware interruptions and the tasks are executed by the microprocessor according to a program.

Message files denoted MF1 to MF3 are associated with the first task F1 for receiving messages caused by the occurrence of the predetermined events. As shown in FIG. 1, the IT handlers IT1 and IT2 are reserved for a message file MF1 and the tasks F2 and F3 are reserved for the message files MF2 and MF3, respectively. According to a preferred embodiment of the invention, priority levels can be assigned to the message files. The message files with a higher priority level would be carried out prior to the message files with lower priority levels. Preferably, the files associated with interrupt handlers, that is to say, the file MF1, are given a higher priority level than the files associated with tasks, that is to say, MF2 and MF3.

A message file may be a simple data structure, such as, for example, a FIFO wherein data can be stored and retrieved only by manipulating pointers, that is to say, very quickly. The FIFO is a non-limitative example. A great many other data structures may be used for implementing the message files, provided they can be accessed by an IT handler as will be described hereinafter. Writing in one of these message files can be done from an IT handler IT1 or IT2 as well as from a task F2 or F3. As such writing requires only a manipulation of pointers on memory tables for memory allocation, it only takes a few microseconds. It is thus possible for an IT handler, which has very poor functions, to cause a data writing in these message files. Without such a data structure associated with the first task, it would be necessary to have a specific extra task for processing messages from IT handlers, the messages being destined for the first task.

The architecture comprises semaphore means denoted S for stalling the first task F1 (the task is said to be pending on the semaphore S) until one of the predetermined set of events occurs. The event can cause writing in one of the message files from an IT handler or a task. The writing also causes a release of the semaphore. The semaphore means comprise a counter that is incremented whenever one of said predetermined set of events occurs. The first task F1 is thus pending on its semaphore until one of the predetermined set of events occurs. The occurrence of the event wakes up the task for executing a specific program with respect to the occurred event. The semaphore's counter is incremented upon reception of a message in any of the associated files. The counter indicates how many messages are not read yet by the first task F1. Whenever a message is read by the first task F1, the counter is decremented.

All received messages are actually physically stored in a pre-allocated memory table or file. A memory location chain is allocated to each message file and contains all the received messages of each file. The information contained in the messages can be retrieved by accessing the address of the first location of a chain.

Upon reception of a new message, a free location is allocated to the new message. In order to avoid allocation of a free location for two different purposes at the same time, it is necessary to temporarily block a "interruptions" during reception of the message to be sure that allocation can be complete. A blocking mechanism is generally comprised in the operating system. It is used here for temporarily blocking "interruptions" coming from the IT handlers IT1 and IT2 during a message reception, that is to say, during data writing in one of the message files. In effect, blocking the interruptions prevents the tasks or IT handlers from taking priority over processing of the current task. As mentioned before, the memory allocation takes very little time. The interrupts then need to be blocked for a few microseconds only, which is generally acceptable for real-time applications.

While no new message is received, the first task is pending on its semaphore S until an event occurs from one of the tasks or IT handlers. This is illustrated by an arrow 11 in dotted lines starting with a big dot. An occurrence of an event causes a certain data to be written into the reserved file, which is illustrated by a solid-line arrow 12. The task or IT handler, which caused said data writing, also caused the semaphore S to be released and its counter to be incremented. This indicates that a new message is received in one of the associated message files. The release of the semaphore is indicated by a dotted-line arrow 13. Upon release of the semaphore S, the first task F1 is waked up so as to resume its execution.

According to the preferred embodiment of the invention, as soon as the first task is waked up, it starts looking into the message files with the highest priority level to check if there are unread messages in this message file. It then reads and processes the messages in the order of priority given to the files in which the messages are received. As shown in FIG. 1, the task F1 starts reading the messages in the message file MF1 which has the highest priority. Once a message is read, the semaphore's counter is decremented. The reading is illustrated by an arrow in solid lines starting with a big dot 14.

If the semaphore's counter is positive (or equal to zero depending on the implementation of the semaphore in the operating system), there are unread messages in at least one of the associated message files. In that case, the first task keeps on reading and processing the received messages. As soon as the counter becomes negative (or equal to zero in the case where zero is not included in the preceding), the first task is said to be blocked on its semaphore until a new message arrives and causes the counter to become positive again. The same mechanism as described with the first task F1 can be implemented with the tasks F2 and F3.

The mechanism described hereinbefore causes a task, the first task F1 as shown in FIG. 1, to be stalled until one of a predetermined set of events occurs. These events may be caused by execution of tasks, like F2 and F3, or by execution of interrupt handlers, like IT1 and IT2. The mechanism is based on the implementation of the message files which are associated with the first task for receiving messages from other tasks or from IT handlers. The interrupts are temporarily blocked during writing of the messages to prevent a memory conflict.

FIG. 2 is a block diagram illustrating a computer system for implementing a software architecture as shown in FIG. 1. It comprises a microprocessor μP which is embedded in an apparatus. The microprocessor executes a pre-stored program so as to control the apparatus. The program includes tasks 21 which are controlled by a scheduler SCHED with respect to the program. Interrupts denoted ITs may be generated by hardware components. The arrival of an ASCI character on the serial line may cause an interrupt. The interrupts are first processed by an interrupt server IT SERV. It selects an appropriate interrupt handler 25 depending on the source of the interrupt. Subsequently, the IT handler processes the interrupt. In FIG. 2, the IT handlers and tasks are represented inside the microprocessor block. This only means that they are executed by the microprocessor. However, the code associated with the tasks and interrupts can be stored in any memory location either inside or outside the microprocessor. Specific memory means are also indicated in the form of a block MEM for representing the memory locations corresponding to the message files MF1, MF2 and MF3 or the semaphore means as described with reference to FIG. 1. The message files and semaphore means can also be stored in separate memory means.

Figure 3:
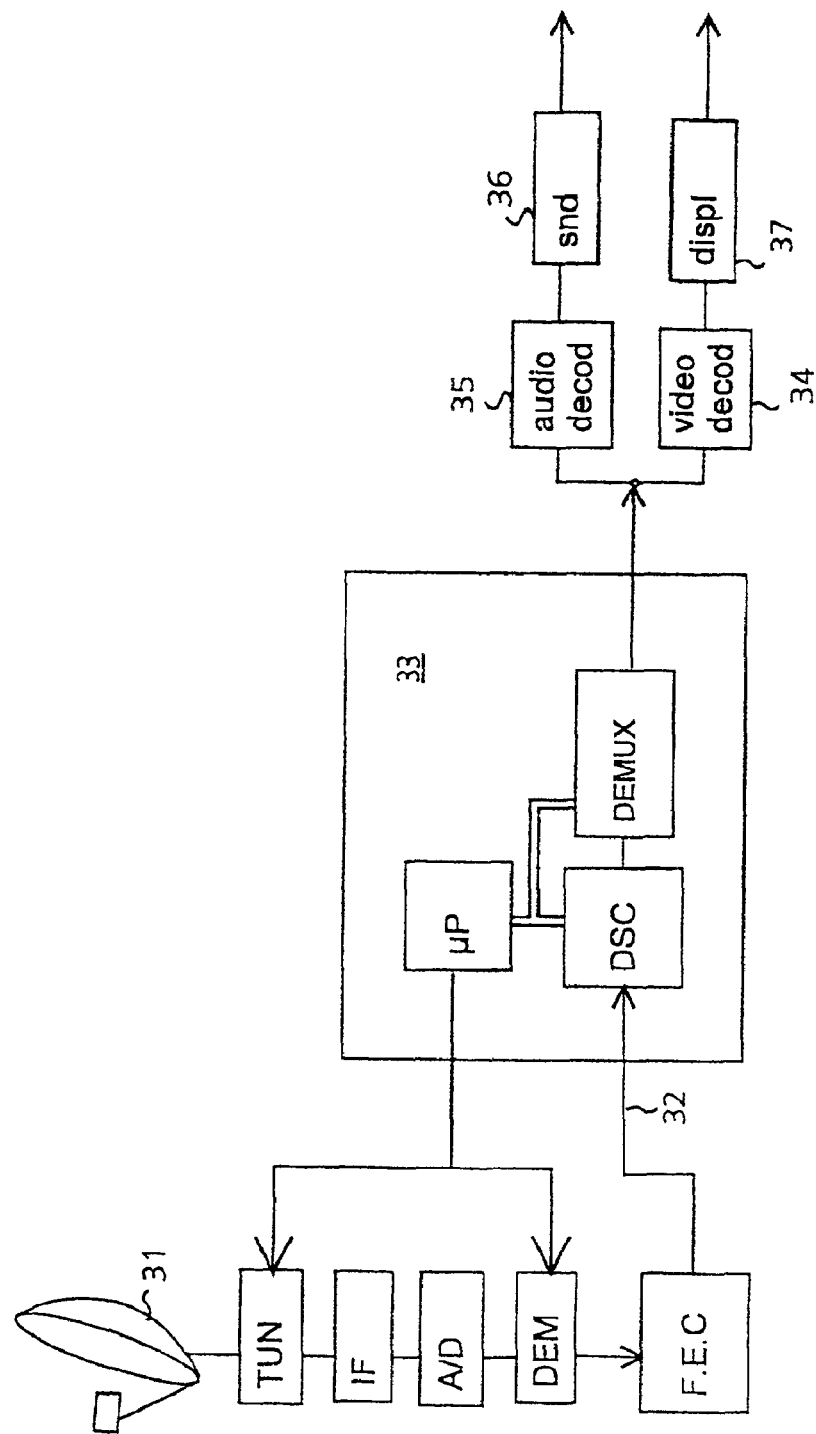
FIG. 3 is a block diagram of an electronic apparatus according to the invention.

A block diagram of an example of an electronic apparatus according to the invention is illustrated in FIG. 3. It diagrammatically shows a TV receiving and decoding device, or set top box, intended to receive cable or satellite audio and video interactive programs.

The electronic apparatus illustrated in FIG. 3 comprises a parabolic antenna 31 including a frequency conversion block, a tuner TUN and an intermediate frequency amplifier IF. The intermediate frequency amplifier IF provides an output signal which is converted into digital values in an analog-to-digital converter A/D and is subsequently demodulated by a demodulator DEM. Finally, certain errors are corrected in an error corrector F.E.C. ("Forward Error Correction").

The description given below is a non-limitative example: the input of the device might just as well be connected to, for example, a cable or a hertzian distribution system, in which cases the modules TUN, IF, A/D and DEM would be different.

The demodulated signal at the output of the error corrector F.E.C. is an MPEG-2 TS signal ("MPEG-2 Transport Stream"). This signal comprises several programs with sound and data, which may be scrambled in some cases.

In the simplest case, this MPEG-2 TS signal is directly supplied through a connection 32 of the parallel type to an unscrambling, conditional access, and demultiplexing integrated circuit 33. The signal is unscrambled in an unscrambling circuit DSC, transmitted to a microprocessor μP via a bus, and then to a demultiplexer DEMUX, also via a bus. The demultiplexer selects a program from the MPEG-2 TS signal. This program is applied in digital form to a video decoder 34 and an audio decoder 35. In response, these decoders supply analog signals so as to project an image on a screen and generate sound from a loudspeaker, respectively. These decoders are followed by audio and video circuits 36, 37, respectively, connected to an external television. The device described here may thus be a box which is designed to be connected to an input of a peripheral TV monitor or a classical TV set. Alternatively, all these circuits may be incorporated in a TV set.

A software architecture as shown in FIG. 1 can be implemented, for example, in a microprocessor block of the unscrambling, conditional access, and demultiplexing integrated circuit 33. An interrupt IT1 or IT2 can be caused by, for example, the presence of an ASCI character on the serial line (not shown in the Figure) for test purposes during the manufacturing process. An interrupt may also be caused by the presence of a RC6 remote control code during the normal working process of the set top box. An interrupt may also be caused by the presence of a data burst at the entry of the demultiplexer DEMUX. By way of example, the first task F1 may be waiting for a TCP/IP stack coming from the other tasks F3 or F2.

An advantageous application of the invention is described below. According to this example, the predetermined events cause writings in specific message files associated with a first task, by other tasks or interrupts handler. In the latter case, the writing is caused by a hardware interruption which is to be handled by an appropriate IT handler. The IT handler may need to send a message to a specific task. For example, if the interruption is related to the arrival of an ASCI character, the IT handler which handles this interruption may need to communicate the ASCI character to the first task. Normally, it would be necessary to have a specific task for transferring the message from the IT handler to the destined first task. According to the invention, which provides associated message files to the tasks, the IT handler can send its message, comprising the ASCI character, to the destined first task via a reserved message file which is associated with the first task. The first task can collect all ASCI characters coming from the IT handler and build a character chain. Subsequently, the first task can transmit the whole chain to a second task which needs to process this character chain.

Figure 4:
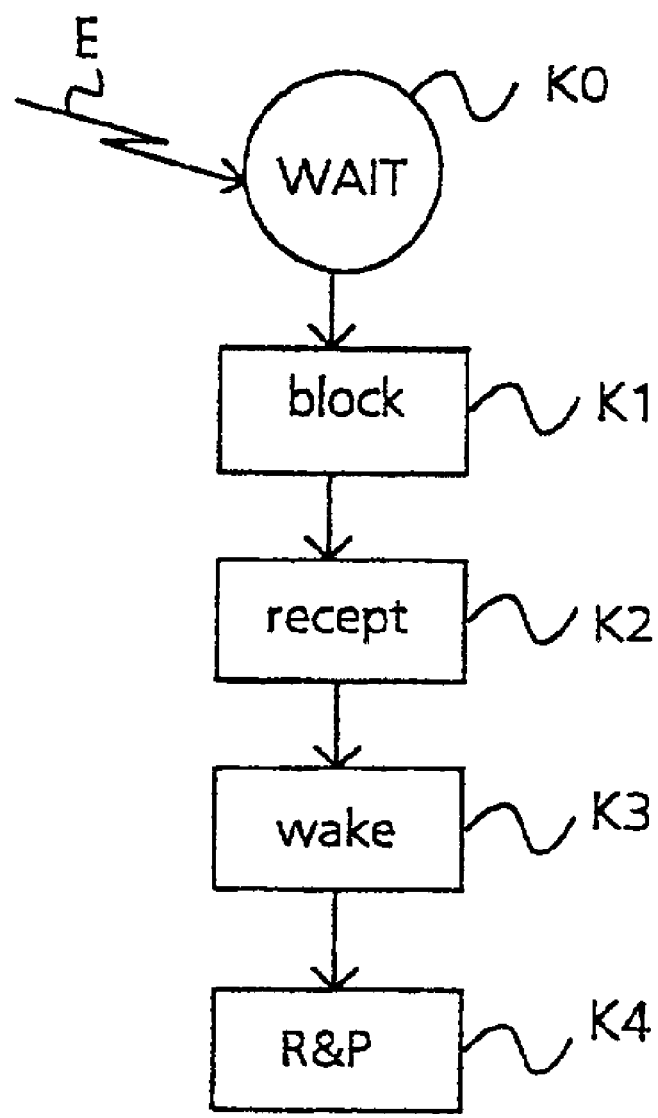
FIG. 4 illustrates a method according to the invention.

FIG. 4 is a diagram illustrating a method of synchronizing a task with respect to an occurrence of one of a predetermined set of events, denoted E, according to the invention. The steps of the method are indicated in cases K0 to K4, wherein:

K0 is a waiting step WAIT for making a first task F1 wait for a specific semaphore until one of a predetermined set of events E occurs, the first task being associated with message files for receiving messages caused by the occurrence of the predetermined events, K1 is a blocking step "block" for temporarily blocking interruptions coming from IT handlers during reception of said messages in order to avoid memory allocation conflicts during the following message reception step, K2 is a message reception step "recept" for receiving a message in one of the associated files of the first task, K3 is a wake-up step "wake" for waking up the first task upon the occurrence of one of the predetermined event, K4 is a reading and processing step "R&P" for reading and processing the messages received in the message files.

What is claimed is:

1. A computer program product comprising:
semaphore means for stalling a first task until one of a predetermined set of events occurs, and
a plurality of message files associated with said first task for receiving data to be processed by the first task, the occurrence of one of said set of predetermined events causing a piece of data to be written in one of the associated message files;
wherein the message files are each given a priority level; and
wherein the first task is capable of processing the data in the message files in order of the priority of the message files.

2. A computer program product as claimed in claim 1, wherein said set of predetermined events includes hardware interruptions, a hardware interruption causing a selected interruption handler to write data into one of the message files associated with the first task, a blocking mechanism being used for temporarily blocking the interruptions during said data writing into the message file.

3. A computer program product as claimed in any one of claim 1 or 2, wherein said set of predetermined events includes at least an event causing a second task to write data into one of the associated message files.

4. A computer program product as claimed in claim 1, wherein the message files with the highest priority level are allocated to interruption handlers so as to receive data from said interruption handlers.

5. A computer program product as claimed in any one of claims 1 to 4, wherein said message files comprise a data structure which is accessible by pointer manipulation.

6. A computer system for implementing a computer program as claimed in any one of claims 1 to 5, wherein said system comprises:
a processor for executing a set of schedulable tasks including at least the first task,
a scheduler for selecting one of said schedulable tasks for execution by said processor,
at least an interrupt handler for handling interrupts,
an interrupt server for performing a specific function in response to the occurrence of an interrupt.

7. An electronic apparatus comprising a computer system as claimed in claim 6.

8. A method of synchronizing a first task with respect to an occurrence of one of a predetermined set of events, the method comprising:
a waiting step for making said first task wait for a specific semaphore until one of said predetermined set of events occurs, said first task being associated with a plurality of message files for receiving data in a message, said data reception being caused by the occurrence of one of said predetermined events, the message files each given a priority level,
a blocking step for temporarily blocking interruptions during reception of said data,
a reception step for receiving said data in at least one of the associated message files,
a wakeup step for waking up said first task upon reception of the data in at least one of its associated files, and
a reading and processing step performed by said first task for reading and processing the data received in at least one of the message files, wherein processing the data comprises processing the data in the message files in order of the priority of the message files.

9. A method as claimed in claim 8, wherein said set of predetermined events includes hardware interrupts causing interrupt handlers to write data into one of the message files associated with the first task.

10. The computer program product of claim 1, wherein:
the message files comprise first-in, first-out data structures; and an interrupt handler is capable of writing data to the first-in, first-out data structures.

11. The computer program product of claim 1, wherein the semaphore means comprise a counter capable of being incremented when a message is received in any of the message files and capable of being decremented when a message is read from any of the message files by the first task.

12. The method of claim 8, wherein:

the message files comprise first-in, first-out data structures; and an interrupt handler is capable of writing data to the first-in, first-out data structures.

13. A system, comprising:

a processor capable of executing at least one task including a first task and at least one interrupt handler;

a memory capable of storing a plurality of message files associated with the first task, the message files containing data to be processed by the first task, the message files each given a priority level;

a scheduler capable of controlling the at least one task; and an interrupt server capable of providing an interrupt to one of the at least one interrupt handler for processing;

wherein the scheduler is capable of using a semaphore to stall the first task until at least one of a plurality of events occurs; and wherein the occurrence of at least one of the events causes data to be written in at least one of the message files, the first task capable of processing the data in the message files in order of the priority of the message files.

14. The system of claim 13, wherein the plurality of events includes a hardware interrupt capable of causing one of the at least one interrupt handler to write data into one of the message files associated with the first task.

15. The system of claim 14, wherein a blocking mechanism is capable of temporarily blocking the hardware interrupts when data is being written into one of the message files.

16. The system of claim 13, wherein the plurality of events includes an event causing a second task to write data into one of the message files.

17. The system of claim 13, wherein one or more of the message files are capable of receiving data from the at least one interrupt handler and are assigned a highest priority level.

18. The system of claim 13, wherein the message files comprise first-in, first-out data structures.

19. The system of claim 18, wherein the at least one interrupt handler is capable of writing data to the first-in, first-out data structures.

20. The system of clam 13, wherein the semaphore comprises a counter capable of being incremented when a message is received in any of the message files and capable of being decremented when a message is read from any of the message files by the first task.

* * * * *